United States Patent [19]
Ahmed et al.

[11] Patent Number: 5,975,095
[45] Date of Patent: *Nov. 2, 1999

[54] ENZYMATIC DETERGENT COMPOSITION AND METHOD FOR DEGRADING AND REMOVING BACTERIAL CELLULOSE AND GLYCERIDES

[75] Inventors: Fahim U. Ahmed; James E. Goldschmidt; Gerald E. La Cosse, all of Greensboro, N.C.

[73] Assignee: Kay Chemical Company, Greensboro, N.C.

[*] Notice: This patent is subject to a terminal disclaimer.

[21] Appl. No.: 09/095,719

[22] Filed: Jun. 11, 1998

Related U.S. Application Data

[63] Continuation-in-part of application No. 08/610,946, Mar. 5, 1996.

[51] Int. Cl.⁶ .............................. C11D 3/386; C11D 3/10; C11D 3/12; B08B 9/00
[52] U.S. Cl. ..................... 134/22.13; 510/191; 510/193; 510/194; 510/195; 510/199; 510/392; 510/421; 134/22.14; 436/263; 210/636
[58] Field of Search ................................ 510/191, 193, 510/194, 195, 199, 396, 471; 134/22.13, 22.19; 210/636; 435/263

[56] References Cited

U.S. PATENT DOCUMENTS

| | | | |
|---|---|---|---|
| 2,497,057 | 2/1950 | Pape et al. | 510/191 |
| 3,506,582 | 4/1970 | Gertzman et al. | 510/195 |
| 3,532,599 | 10/1970 | Cooperman | 435/264 |
| 4,587,032 | 5/1986 | Rogers | 510/195 |
| 4,610,800 | 9/1986 | Durham et al. | 435/264 |
| 4,778,617 | 10/1988 | Shaer et al. | |
| 4,861,511 | 8/1989 | Kaplan | 510/193 |
| 4,900,467 | 2/1990 | Smith | 510/195 |
| 4,936,994 | 6/1990 | Wiatr | 210/632 |
| 5,011,538 | 4/1991 | Smith | 134/22.13 |
| 5,238,572 | 8/1993 | Hernandez-Mena et al. | 210/632 |
| 5,238,843 | 8/1993 | Carpenter et al. | 435/264 |
| 5,264,146 | 11/1993 | Tobiason | 134/7 |
| 5,284,587 | 2/1994 | Wong et al. | 210/606 |
| 5,326,477 | 7/1994 | Fugua et al. | 210/632 |
| 5,336,426 | 8/1994 | Rader et al. | 510/195 |
| 5,348,682 | 9/1994 | Finley et al. | 510/373 |
| 5,389,157 | 2/1995 | Smith | 134/22.13 |
| 5,407,595 | 4/1995 | Kamiya | 510/195 |
| 5,411,666 | 5/1995 | Hollis et al. | 210/632 |
| 5,429,764 | 7/1995 | Van Vlahaks et al. | 510/195 |
| 5,432,184 | 7/1995 | Donofrio et al. | 514/345 |
| 5,443,656 | 8/1995 | Burrows et al. | 134/42 |
| 5,520,746 | 5/1996 | Kamiya | 134/22.11 |
| 5,630,883 | 5/1997 | Steer et al. | 134/22.13 |
| 5,783,537 | 7/1998 | Ahmed et al. | 510/193 |
| 5,863,882 | 1/1999 | Lin et al. | 510/397 |

OTHER PUBLICATIONS

Japan Patent Abstracts 58–101698, Jun. 16, 1983.
Kirk–Othmer, Encyclopedia of Chemical Technology, vol. 5, pp. 476–496.
Cellulases–Enzymes that Hydrolyze Fiber, "Novo's Handbook of Practical Biotechnology," C.O.L. Boyce ed., Novo Nordisk 2d ed., pp. 77–82 1986).
Derwent Abstract WPI 90–115983/15.
Schramm et al., "Factors Affecting Production of Cellulose at the Air/Liquid Interface of a Culture of *Acetobacter xylinum*," J. Gen. Microbiol. 11:123–29 (1954).
Peitersen, "Production of Cellulose and Protein from Barley Straw by *Techoderma vivide*," Biotech. & Bioeng. 17:361–74 (1975).
Mandels et al., "Introduction of Cellulose in Fungi by Cellobiase," J. Bacteriol. 79:816–26 (1960).
Mandels et al., "Sophorose as an Inducer of Cellulose in *Trichoderma vivide*," J. Bacteriol. 83:400–08 (1962).
Katz et al., "Production of Glucose by Enzymatic Hydrolysis of Cellulose," Appl. Microbiol. 16(2):419–20 (1968).

*Primary Examiner*—Kery Fries
*Attorney, Agent, or Firm*—Finnegan, Henderson, Farabow, Garrett & Dunner, L.L.P.

[57] ABSTRACT

This invention relates to an enzymatic detergent drain cleaner composition comprising:

about 0.005% to about 20% by weight of an acid lipase having hydrolytic activity to ester bonds, specific to glyceride linkages;

about 0.005% to about 20% by weight of an acid cellulase enzyme having hydrolytic activity specific to β-glucosidic bonds;

about 1–70 wt % of a water soluble carbonate salt;

about 1–70 wt % of a water soluble acid that reacts in an aqueous medium with the carbonate salt to form carbon dioxide that dissolves in the aqueous medium;

about 0.1–10 wt % of a surfactant; and about 0.05–5 wt % of a thickening agent. This detergent composition may be used as an enzymatic detergent drain cleaner or in a method for removing or preventing bacterial cellulose and glyceride deposits in an aqueous system.

55 Claims, No Drawings

ENZYMATIC DETERGENT COMPOSITION AND METHOD FOR DEGRADING AND REMOVING BACTERIAL CELLULOSE AND GLYCERIDES

This application is an continuation-in-part of Ser. No. 08/650,946 filed Mar. 5, 1996.

BACKGROUND OF THE INVENTION

1. Field of Invention

This invention relates to compositions and methods for degrading, removing, and preventing bacterial cellulose and glyceride deposits. More particularly, this invention relates to enzymatic detergent compositions and methods of using them to degrade, remove, and prevent polymeric bacterial cellulose deposits in aqueous systems such as drain pipes. Additionally, this invention relates to enzymatic detergent compositions and methods of using them to degrade, remove, and prevent fatty and oily glyceride deposits in aqueous systems such as drain pipes.

2. Description of the Related Art

Traditional approaches to controlling or eliminating the problem of bacterial cellulose build-up in sugar or alcohol enriched drain systems typically have included contacting the cellulose with highly corrosive chemicals, such as concentrated hydrochloric acid, concentrated sulfuric acid, sodium hypochlorite, sodium silicate, chlorine bleach, phenylmercuric acetate, pentachlorophenol, tributyltin oxide, isocyanurates, or sodium hydroxide. However, these treatments have proven ineffective or incapable of removing deposited cellulosic slime, and they have several drawbacks associated with their use. Most of these chemicals are toxic to many organisms, including humans. Their toxicity makes them very dangerous during handling, and they contaminate and pollute if they are discharged into the enviroment. In addition to the problems engendered by toxicity, many of these toxic and hazardous chemicals can damage the drain systems where bacterial cellulose deposits are found.

Mechanical water jetting and rotor rooting are nontoxic alternatives to the chemical treatments described above. Of these, water jetting is preferred because it is less likely to cause damage to the drain systems. Yet neither method is an effective, acceptable treatment to prevent or remove bacterial cellulose deposits in drain systems. Bacterial cellulose accumulates rapidly in susceptible drain systems, and to keep such drains completely clear by these mechanical means requires frequent treatments. The frequent interruption in drain service occasioned by jetting or rooting makes them impractical. In addition, both methods involve significant manual labor, adding considerably to the cost of removing the deposits. Their cost and inefficiency make jetting or rooting uneconomical as prophylactic treatments. The result is that many drains having a bacterial cellulose problem are ineffectively and infrequently treated and therefore function at a severely reduced capacity or not at all.

Drain systems also have the problem of glyceride deposits resulting from grease effluents passing through the system. This problem is especially prevalent in the food service industry. Traditional treatments for controlling or eliminating the problem of glyceride deposits include the chemical treatment with highly corrosive chemicals and the mechanical water jetting and rotor rooting methods described above. However, the use of these traditional treatments for controlling or eliminating the glyceride deposits suffer the same disadvantages found in the traditional treatment of bacterial cellulose build-up.

U.S. Pat. No. 5,443,656 to Burrows et al. proposes a process for degrading fibrous cellulose materials, more particularly toilet tissue in aqueous waste holding tanks, by contacting the material with a composition comprising a cellulase enzyme, sodium bicarbonate, and citric acid. However, this method does not use an enzyme having activity specific to polymeric cellulose typically produced by microorganisms such as Acetobacter bacteria, and the enzyme concentrations disclosed are too low for effectively treating cellulose deposited by such microorganisms. Further, the method according to the Burrows patent does not disclose the use of any lipase enzyme. Moreover, compositions disclosed in this reference contain large quantities of sodium chloride, which drastically reduces cellulase enzyme activity under the conditions wherein the present invention is applied.

U.S. Pat. No. 3,506,582 to Gertzman discloses enzymatic drain cleaner compositions composed of a metal salt of carbonic acid, glucono-delta-lactone, and a mixture of enzymes, including amylase, protease, lipase, pectinase, and cellulase. These compositions suffer the same drawbacks found in the Burrows patent, i.e., they do not address the polymeric bacterial cellulose substrate produced by microorganisms such as Acetobacter bacteria, and they contain significant amounts of sodium chloride, which inhibits enzyme activity under the conditions where such bacterial cellulose deposits are found. Moreover, the disclosed compositions do not require an acid lipase enzymes specific to degrade oily and fatty materials, i.e., lipase enzymes having hydrolytic activity to ester bonds, specific to glyceride linkages.

U.S. Pat. No. 5,264,146 to Tobiason discloses a method and composition for carrying sewer or drain cleaning agents, including lipase and lipase excreting bacteria, to clean drains and sewer lines. This reference neither discloses nor suggests using an enzyme having activity specific to the troublesome cellulose deposited in sugar and alcohol enriched environments by microorganisms such as Acetobacter bacteria. Further, this reference suffers the same drawbacks found in the Gertzman patent; Tobiason fails to require that the lipase enzymes possess hydrolytic activity to ester bonds, specific to glyceride linkages. Moreover, the disclosed compositions can contain other cleaning agents, including corrosive chemicals such as caustic soda and harmful solvents such as dichlorobenzene.

U.S. Pat. Nos. 5,407,595 and 5,520,746 to Kamiya discloses a detergent drain pipe cleaning composition comprising a lipocatabolic lipase, an imbibing agent such as sodium bicarbonate, and an N-acyclic amino acid, but no cellulase enzyme. Thus, this composition also is not specific to cellulose produced by microorganisms such as Acetobacter bacteria, and therefore is not effective to address the problem solved by the present invention.

The drain systems in commercial service establishments, such as restaurants and bars, present a unique problem. In these establishments, particularly quick service restaurants, high quantities of fats, oils and grease produced by spillage, frying vats and washing sinks are found in the waste water. As the waste water passes through the drain system, glycerides from the fats, oils and grease deposit in the aqueous system. Additionally, bacterial cellulose deposits are also produced because of the presence of sugars and alcohols in the drain system. It is therefore common for these drain systems to have both bacterial cellulose deposits and glyceride deposits, with the glyceride deposits frequently absorbed onto the bacterial cellulose surface because of the bacterial cellulose's spongy nature and absorbtive capacity.

While concentrated sodium hydroxide or $H_2SO_4$ will typically hydrolyze to the soluble fractions glyceride deposits from the fats, oils and grease, these corrosive chemicals are undesirable for use because of their toxicity and ineffectiveness in removing deposited cellulosic slime. Further, when the glyceride deposits are absorbed on the bacterial cellulose surface, it is very difficult for an acid cellulose enzyme to break down the deposits. In fact, the hydrolytic activity of the acid cellulose enzyme is reduced. Thus, an effective drain cleaner for the aqueous drain systems containing both bacterial cellulose deposits and glyceride deposits typically found in commercial service establishments is necessary. Prior to the present invention, there were no such commercial products available to address the drain system problems associated with both bacterial cellulose and glyceride deposits.

SUMMARY OF INVENTION

The present invention relates to enzymatic detergent drain cleaners, compositions of matter, and methods for removing or preventing glyceride deposits and cellulose deposits produced by microorganisms such as Acetobacter bacteria in aqueous systems. These drain cleaners, compositions and methods are safe and economical, do not require the use of chemicals that are hazardous or toxic to humans and other life forms, decrease the risk of environmental harm, and minimize ecological harm to the aqueous systems requiring removal or prevention of bacterial cellulose deposits and fatty grease deposits.

Particularly, the present invention relates to drain cleaners and compositions containing a biologically derived acid lipase enzyme possessing hydrolytic activity to ester bonds, specific to glyceride linkages, and a biologically derived acid cellulase enzyme possessing hydrolytic activity specific to β-glucosidic bonds in cellulose produced and deposited in aqueous systems by microorganisms such as Acetobacter bacteria. The inventors have discovered that the acid lipase enzyme breaks down the fatty grease deposits into soluble mono-glycerides and fatty acids, allowing the cellulose enzyme to hydrolyze the bacterial cellulose into more soluble monosaccharides.

When the bacterial cellulose deposit is coated with a glyceride deposit, the inventors have discovered that an enzymatic detergent drain cleaner containing both an acid lipase enzyme and an acid cellulase enzyme enhanced the hydrolyzing reaction of the cellulose and glyceride deposits. This is a significant improvement over an enzymatic detergent drain cleaner containing only an acid cellulase enzyme which has its hydrolyzing activity diminished when applied to the same deposit.

The inventors have also discovered that by providing the enzymatic detergent drain cleaners and compositions with an enriched dissolved carbon dioxide concentration or with a system for enriching the dissolved carbon dioxide concentration in the aqueous system being treated, the efficacy of the enzymatic hydrolysis of cellulose, and thus the total degradation reaction, is significantly increased.

In the inventive methods, the enzymatic detergent drain cleaners and compositions are contacted with an aqueous system in need of removal or prevention of bacterial cellulose deposits and glyceride deposits for a sufficient time to allow at least partial hydrolysis of the bacterial cellulose, thereby effecting its easy removal. The inventors also have discovered preferred systems for generating and enriching carbon dioxide, which systems also contribute detergent action to the claimed drain cleaners, compositions and methods, and preferred surfactants and thickening agents that improve the effectiveness of the claimed drain cleaners, compositions and methods.

DETAILED DESCRIPTION OF THE INVENTION

Microbial cellulose is a floppy, slimy, gelatinous mass produced by microorganisms such as Acetobacter bacteria. This material appears in nature when such bacteria come into contact with decomposing fruit or other sugar or alcohol enriched matter. Acetobacter bacteria thrive in natural or artificial sugar or alcohol enriched acidic environments, such as are found in flowers, fruits, leaves, saps, honey, vinegar, cider, wine, beer, syrups, fruit juices, and the like. Fermentation of sugar by the Acetobacter bacteria results in a catalyzed biosynthesis of cellulose fibrils, which accumulate around the bacteria cells.

For example, *Acetobacter zymomonas* will ferment sucrose to ethanol via glucose within 8 to 12 hours of contacting the sucrose creating a highly suitable medium for the continued development of this acetic acid bacterium. Glucose forms the repeating cellobiose sub-units of cellulose, which is a β-1,4' polymer of D-glucose having β-glucosidic linkages. The general reaction scheme is believed to be as follows:

$$C_{12}H_{22}O_{11}(\text{sucrose}) \rightarrow C_6H_{12}O_6(\text{glucose}) + C_6H_{12}O_6(\text{fructose})$$

$$C_6H_{12}O_6(\text{glucose}) \rightarrow C_2H_5OH(\text{ethanol}) + CO_2$$

$$C_2H_5OH(\text{ethanol}) \rightarrow CH_3COOH(\text{acetic acid}).$$

During fermentation, this acetic acid bacterium will begin to multiply after 2–3 days, utilizing the glucose or sucrose that are present in the early stages of the fermentation.

The cellulose strand secreted by the acetic subspecies *Acetobacter xylinium* is a particularly unusual product. Under appropriate conditions, this Acetobacter will synthesize cellulose from glucose into a ribbon of 0.05 to 0.1 μm diameter at a rate of approximately 2 μm per minute. The ribbons of this cellulose appear to polymerize and crystallize into larger strands, which provide a floating mat or pellicle that furnishes the aerobic Acetobacter with a surface on which to grow in an aqueous medium.

One particularly troublesome manifestation of polymeric bacterial cellulose occurs in sugar or alcohol enriched drain pipes such as are connected to soft drink or beverage stations including alcoholic beverage in food service, bar, and hotel establishments. Here, in this highly favorable environment, Acetobacter bacteria and other cellulose-secreting microorganisms easily produce polymeric bacterial cellulose, which builds up in the drain pipes and ultimately can block the drain system.

The drain system in these food service, bar, and hotel establishments also contain glyceride deposits. These glyceride deposits result from the fat, oil and grease byproducts that the cooking operations in these establishments produce. As the waste water containing the fat, oil and grease byproducts runs through the drain system, the glyceride deposits are produced. Presently, there are no suitable, effective, safe, non-polluting, and non-corrosive solutions to this unique problem.

The inventors have discovered enzymatic detergent drain cleaners and compositions and methods of using them to prevent or remove glyceride deposits from fats, oils and grease, and polymeric bacterial cellulose deposits produced in aqueous systems by Acetobacter bacteria. In a first embodiment, the enzymatic detergent drain cleaner of the present invention comprises an acid lipase enzyme possessing hydrolytic activity to ester bonds, specific to mono-, di- and triglyceride linkages, and an acid cellulase enzyme having hydrolytic activity specific to the β-glucosidic bonds of bacterial cellulose, a water-soluble carbonate or bicarbonate salt, and a water soluble acid that reacts with the carbonate salt in an aqueous medium to form carbon dioxide that dissolves in the aqueous medium. Preferably, this enzymatic detergent drain cleaner is prepared in dry form including a surfactant and a thickener, which is conveniently storable in moisture barrier package until use.

In a second embodiment, the composition of the present invention comprises an aqueous solution of an acid lipase enzyme possessing hydrolytic activity to ester bonds, specific to mono-, di- and triglyceride linkages, and present in the aqueous solution an amount of at least 0.005 g/l, and an acid cellulase enzyme having hydrolytic activity specific to the β-glucosidic bonds of bacterial cellulose and present in the aqueous solution an amount of at least 0.005 g/l. This aqueous solution further has a dissolved carbon dioxide concentration of at least 100 ppm at standard temperature and pressure.

In a third embodiment, the invention comprises a method wherein an aqueous system in need of removal or prevention of glyceride deposits and bacterial cellulose deposits is contacted with the enzymatic detergent drain cleaner composition according to the present invention for a sufficient time to permit at least partial hydrolysis of the bacterial cellulose and glycerides, followed by the removal of the partially hydrolyzed cellulose, mono- or diglycerides, glycerol and free fatty acids from the aqueous system.

The acid lipase enzyme possessing hydrolytic activity to ester bonds, specific to glyceride linkages, hydrolyzes triglycerides into mono- and diglycerides, glycerol and free fatty acids. The general reaction schemes are believed to be as follows:

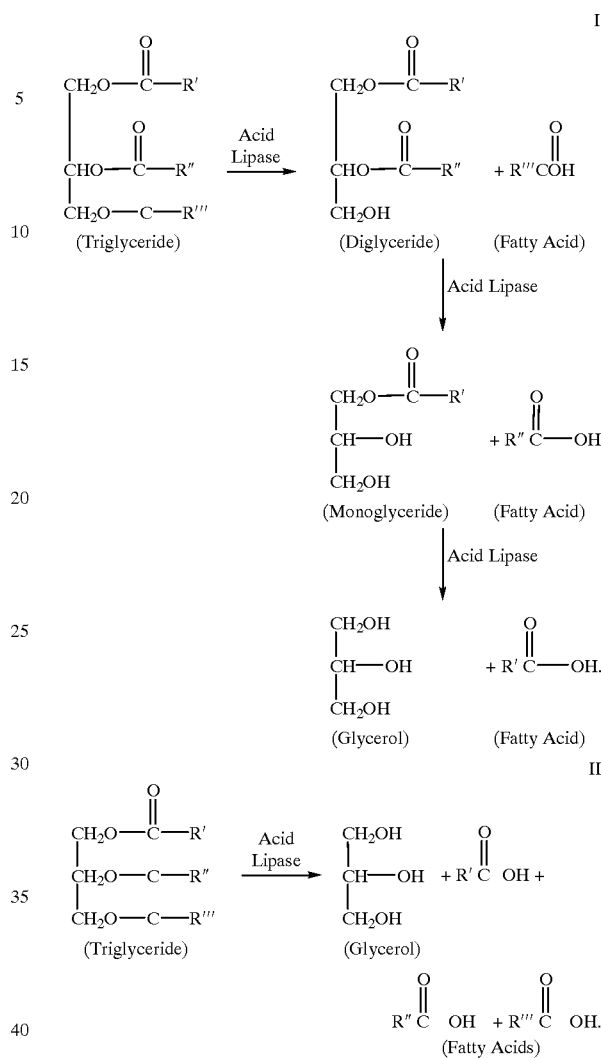

Because the mono- and diglycerides, glycerol and free fatty acids are all more soluble that the original triglycerides, the hydrolysis of the triglycerides facilitates the removal of any fat and oil deposits present in the system.

The acid lipase enzymes having hydrolytic activity to ester bonds, specific to glyceride linkages, can be derived from certain strains of *Aspergillus niger, Mucor miehel, Phizopys arrhizus, Penicillium roqueforti, Candida cylindracea*, or *Staphylococcus aureus* or their mutants or variants either naturally or artificially induced. The acid lipase enzymes according to the present invention can also be derived from pancreatic sources, such as bovine or swine pancreas glands. Any acid lipase enzymes possessing hydrolytic activity to ester bonds, specific to glyceride linkages, can be used.

Representative acid lipase enzymes include Lipolase™, Lipolase™ Ultra, Palatase™ A, Palatase™ M and Lipozyme™ commercially available from Novo Industri A/S. These acid lipase enzymes are 1,3-specific lipase enzymes that hydrolyze the fatty acid at the 1 and 3 position of the triglyceride. Another representative acid lipase enzyme is the Yeast Lipase-BCC commercially available from Bio-Cat, Inc. This enzyme is derived from a select strain of *Candida cylindracea* and is a non-specific lipase enzyme which hydrolyzes the fatty acid at all three positions of the triglyceride.

Where the enzymatic detergent drain cleaners according to the present invention are prepared in dry form, i.e. exclusive of any water added to form a solution, but including any water normally complexed or bound with dry ingredients, the acid lipase enzyme should be present in an amount of about 0.005% to about 20% by weight, preferably about 0.01% to about 15% by weight, more preferably about 0.1% to about 10% by weight, even more preferably about 0.5% to about 8% by weight, and most preferably about 1% to about 6% by weight. Where the compositions according to the present invention are prepared as aqueous solutions, the acid lipase enzyme concentration in the solution should be at least about 0.005 g/l, preferably at least about 0.01 g/l.

The acidic cellulase enzyme specific to hydrolysis of the polymeric cellulose produced by Acetobacter bacteria can be derived from certain strains of *Trichoderma reesei* or *Aspergillus niger*, or their mutants or variants either naturally or artificially induced. As used herein, *Trichoderma reesei* denotes microorganisms known by that name, as well as those microorganisms classified under the names *Trichoderma longibrachiatum* and *Trichoderma viride*. Any cellulase enzyme or enzyme complex that is specific to hydrolysis of cellulose produced by Acetobacter bacteria can be used.

A representative acid cellulase enzyme is the Cellulase Tr Concentrate multi-enzyme acid cellulase complex, which is commercially available from Solvay Enzymes, Inc. Cellulase Tr Concentrate is a food grade cellulase complex obtained by controlled fermentation of a selected strain of *Trichoderma reesei*. This enzyme complex consists of both exoglucanases and endoglucanases that directly attack native cellulose, native cellulose derivatives, and soluble cellulose derivatives. This enzyme complex specifically hydrolyzes the β-D,4-glucosidic bonds of bacterial cellulose, in particular the polymeric bacterial cellulose produced by Acetobacter bacteria, as well as its oligomers and derivatives.

Another representative cellulase enzyme commercially available from Solvay Enzymes, Inc. is Cellulase TRL multi-enzyme liquid cellulase complex. Cellulase TRL cellulose enzyme complex is derived from *Trichoderma reesei* in the same manner as Cellulase Tr Concentrate enzyme complex, but is prepared and sold in liquid form. Its activity against bacterial cellulose has been demonstrated to be equivalent to that of Cellulase Tr Concentrate enzyme complex.

Other suitable enzymes for use in the present invention include Celluzyme Acid P enzyme and Celluclast 1.5 L, both commercially available from Novo Nordisk; Multifect™ Cellulase 300 enzyme, commercially available from Genencor International, and Rapidase® Acid Cellulase enzyme, commercially available from Gist-Brocades B. V. Still other cellulase enzymes or cellulase enzyme complexes are suitable for use in the present invention, provided they exhibit specific hydrolytic activity directed at the β-glucosidic linkage characteristic of the polymeric bacterial cellulose produced by microorganisms such as Acetobacter bacteria.

Where the enzymatic detergent drain cleaners according to the present invention are prepared in dry form, i.e. exclusive of any water added to form a solution, but including any water normally complexed or bound with dry ingredients, the acid cellulase enzyme should be present in an amount of about 0.005% to about 20% by weight, preferably about 0.01% to about 15% by weight, more preferably about 0.1% to about 10% by weight, even more preferably from about 0.5% to about 8% by weight, still more preferably from about 2% to about 7% by weight, and most preferably 6% by weight. Where the compositions according to the present invention are prepared as aqueous solutions, the acid cellulase enzyme concentration in the solution should be at least about 0.005 g/l, preferably at least about 0.01 g/l, more preferably at least about 0.10 g/l, and still more preferably at least about 0.30 g/l, and most preferably at least 0.60 g/l.

It is to be understood by those of skill in the art that activities of the commercial acid lipase enzymes and acid cellulase enzymes recited above for use in the present invention may vary slightly from enzyme to enzyme, and that the assays and substrates of the assays used by the manufacturers of these enzyme products to express their activity vary from manufacturer to manufacturer. Nonetheless, it would be a matter of routine experimentation to determine relative equivalents of each commercial enzyme preparation to be used in the present invention merely by choosing one of the numerous lipase and cellulase assay methods known in the art and applying that method uniformly to the commercial preparations.

In the present drain cleaners, compositions and methods, the dissolved carbon dioxide, can be provided by any source, including carbon dioxide gas, carbon dioxide enriched water, and water containing carbon dioxide but, is preferably derived from a system comprising a water-soluble carbonate salt and a water-soluble organic or inorganic acid that under aqueous conditions reacts with one another to generate dissolved carbon dioxide in the aqueous medium. As used herein, the term carbonate salt denotes both carbonate and bicarbonate salts and salts of carbonic acid. Accordingly, suitable water-soluble carbonate salts include lithium carbonate, lithium bicarbonate, sodium and potassium sesquicarbonate, sodium carbonate, sodium bicarbonate, ammonium carbonate, ammonium bicarbonate, potassium carbonate, potassium bicarbonate, calcium carbonate, calcium bicarbonate, magnesium carbonate, and magnesium bicarbonate. Generally acceptable are the carbonate salts of alkali metals (Group IA) and alkaline earth metals (Group IIA).

Any water-soluble organic or inorganic acid can be used in the present invention. Suitable organic acids include, but are not limited to, formic acid, acetic acid, hydroxy acetic acid, propionic acid, butyric acid, valeric acid, caproic acid, lauric acid, palmitic acid, stearic acid, citric acid, tartaric acid, succinic acid, malic acid, uric acid, gluconic acid or its precursor glucono-δ-lactone, polymaleic-acrylic acids, acrylic acids, polyacrylic acids, sebacic acid, maleic acid, benzoic acid, fumaric acid, isophthalic acid, terephthalic acid, suberic acid, pimelic acid, malonic acid, glutaric acid, adipic acid, and lactic acid. Suitable inorganic acids include, but are not limited to hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid, boric acid, sodium bisulfate, and sodium bisulfite.

Various combinations of acids and carbonate salts are suitable for use in the present invention. When dry drain cleaners are prepared according to the present invention, it is preferable to use salts and acids, as well as the other product components, in powder form. Among the disclosed acids, citric acid and sulfamic acid are preferred in an amount of about 10% to about 50% by weight. Citric acid is particularly preferred, since in reacting with the carbonate or bicarbonate salt to form the present compositions, it forms citrate salts, which acts as a "builder" salt, softens the aqueous composition, and contributes to a detergent action, further aiding with the decomposition and removal of bacterial cellulose deposits. A particularly preferred combination of acid and salt is citric acid in an amount of about 42% by weight of the composition, sodium carbonate in an amount of about 1% to about 10%, preferably about 5%, by weight of the composition, and sodium bicarbonate in an amount of about 30% to about 50%, preferably about 39%, by weight of the composition, wherein the sodium carbonate in part acts as a buffering agent and pH conditioner.

Where the drain cleaners according to the present invention are prepared in dry form, the water soluble carbonate salt and the water soluble acid each should be present in an amount of about 1% to about 70% by weight, preferably about 10% to about 50% by weight, more preferably about 13% to about 48% by weight, and most preferably about 15% to about 45% by weight. The carbonate salt and acid need not be present in equivalent amounts. The amount of each component necessary to generate a desired concentration of dissolved carbon dioxide gas can easily be calculated by one of ordinary skill in the art based upon the stoichiometry of the ingredients chosen and the conditions under which they are expected to react.

Where the compositions according to the present invention are prepared in solution form, the amounts of carbonate salt and acid should be chosen to ensure a minimum dissolved carbon dioxide concentration of at least 100 ppm, preferably at least about 300 ppm, more preferably at least about 500 ppm, and most preferably at least about 1000 ppm. Without being bound by theory, it is believed that the enriched carbon dioxide environment provided by the present invention mimics the enriched carbon dioxide environment in which the Acetobacter bacteria biosynthesize polymeric bacterial cellulose, thereby creating an environment in which the activity of the cellulase enzyme is greatly and unexpectedly increased.

In preferred drain cleaners, compositions and methods of application, the carbon dioxide gas provides a forced thickened detergent foam, which helps fill the drain pipe environment in which polymeric cellulose and fatty glyceride deposits typically are found with the enzymatic detergent foam, thereby coating as much as possible of the deposited cellulose and fatty glyceride with the enzymatic detergent or solution. Further, the carbon dioxide foam, as it slowly collapses, allows the drain cleaner or solution to have a substantially increased contact time with the bacterial cellulose and fatty glyceride. Several substantially nonfoaming detergent formulations, where bicarbonate salt was substantially or totally eliminated or replaced by sodium chloride or sodium sulfate, were found to be far less effective to degrade bacterial cellulose, even after 2 weeks long of soaking in a beaker test. By contrast, the detergent foams according to the present invention typically degrade bacterial cellulose completely down after soaking for about twenty-four hours in the beaker test.

In addition to the enzyme and carbon dioxide or carbon dioxide generating system, the drain cleaners and compositions of the present invention may also include an organic or inorganic thickening agent. The thickener acts to cling the active ingredients to the cellulose and fatty glyceride surface, affording increased contact time and thereby enhancing the efficacy of enzymatic degradation of cellulose and triglyceride.

The organic thickening agent of the present invention may be any of a wide variety of organic thickening agents known to those skilled in the art. Particularly preferred are the crosslinked polyacrylic acid-type thickening agents, present in an amount of about 1% to about 5% by weight. As used herein, "polyacrylic acid-type" is intended to refer to water soluble homopolymers of acrylic acid or methacrylic acid or water-dispersible or water-soluble salts, esters and amides thereof, or water-soluble copolymers of these acids or their salts, esters or amides with each other or with one or more ethylenically unsaturated monomers, such as styrene, maleic acid, maleic anhydride, 2-hydroxyethylacrylate, acrylonitrile, vinyl acetate, ethylene, propylene, or the like.

Preferably, the polyacrylic thickening agent is one of the crosslinked polyacrylic acid-type thickening agents commercially available from B. F. Goodrich under the CARBOPOL™ trademark. The CARBOPOL™ resins, also known as carbomer resins, are hydrophilic, high molecular weight, crosslinked acrylic acid polymers having an average equivalent weight of about 76 and a general structure of the formula:

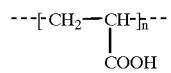

The CARBOPOL™ resins are crosslinked with a polyalkenyl polyether, such as a polyalkyl ether of sucrose having an average of 5.8 alkyl groups per molecule of sucrose. Preferred thickening agents for the present invention include organic polymer thickening agents such as the Carbopol EZ-1™, Carbopol EZ-2™, and Carbopol EZ-ultra™ polymeric thickening agents, which are commercially available from the BF Goodrich Company. Other suitable carbomer thickening agents include the PNC carbomers sold commercially by 3V Inc.

Further suitable organic thickening agents include acrylic copolymers such as the Acusol® polymers sold commercially by Rohm & Haas Company, carboxyvinyl polymers such as the Neutragel™ and Polygel™ polymers sold commercially by 3V Inc., polyacrylate polymers such as the Burco Thix PCS™ polymer sold commercially by Burlington Chemical Co., Inc., and poly(methylvinylether/maleic) anhydride polymers such as Gantrez® polymer sold commercially by International Specialty Products.

Further examples of suitable organic thickeners which can be used in the present invention include Guar gum sold as "Supercol" by Aqualon, Guar hydroxy propyltrimonium chloride sold as "Hi-Care 1000" by Alcolac, corn starch, and urethane associative thickeners sold as "NOPCO" by Henkel Corporation.

Still other suitable organic thickeners include fatty acid thixotropic thickeners such as higher aliphatic fatty monocarboxylic acids having from about 8 to about 22 carbon atoms, inclusive of the carbon atom of the carboxyl group of the fatty acid. The aliphatic radicals are saturated and can be straight or branched. Mixtures of fatty acids may be used, such as those derived from natural sources, such as tallow fatty acid, coco fatty acid, soya fatty acid, etc., or from synthetic sources available from industrial manufacturing processes.

Examples of the fatty acids which can be used as thickeners include, for example, decanoic acid, lauric acid, dodecanoic acid, palmitic acid, myristic acid, stearic acid, oleic acid, eicosanoic acid, tallow fatty acid, coco fatty acid, soya fatty acid and mixtures of these acids. The metal salts of the above fatty acids can also be used in the present invention as thixotropic thickener agents, such as salts of the monovalent and polyvalent metals such as sodium, potassium, magnesium, calcium, aluminum and zinc.

Many of the metal salts are commercially available. For example, the aluminum salts are available in the triacid form, e.g., aluminum stearate as aluminum tristearate, $Al(OCOC_{17}H_{35})_3$. The monoacid salts, e.g., aluminum monostearate, $Al(OH)_2(OCOC_{17}H_{35})$ and diacid salts, e.g. aluminum distearate, $Al(OH)(OCOC_{17}H_{35})_2$, and mixtures of two or three of the mono-, di- and triacid salts can be used for those metals, e.g. Al, with valences of +3, and mixtures of the mono- and diacid salts can be used for those metals, e.g. Zn, with valences of +2.

The thickening agent used in the present invention also may be any one of a number of natural or synthetic inorganic materials, such as clays, silicas, aluminas, titanium dioxide (pyrogenic) and calcium and/or magnesium oxides. All of these materials are readily available from commercial sources.

Various types of clays which are useful include kaolins such as kaolinite, dicktite, nacrite, halloysite and endillite; serpentine clays such as chrysotile and amesite; smectites such as montmorillonite (derived from bentonite rock), beidellite, nontronite, hectorite, saponite and sauconite; illites or micas; glauconite; chlorites and vermiculites; attapulgite and sepiolite. Mixed layer clays exhibiting intercalation of mineral sandwiches with one another may be used, such as, for example, mixed-layer clay mineral sheets of illite interspersed randomly or regularly with montmorillonite, or chlorite with one of the other types of clay, such as vermiculite. Other useful clays include amorphous clays, such as allophane and imogolite, and high-alumina clay minerals such as diaspore, boehmite, bibbsite and cliachite. Various types of silicas which are useful include diatomite, precipitated silica and fumed silica. Various types of aluminas may be used, as well as various types of calcium and magnesium oxides.

Suitable smectite thickening agents include the Aquamont, Gelwhite®, and Mineral Coloid™ montmorillonite thickeners commercially sold by Southern Clay Products, the Bentolite® bentonite thickener commercially sold by Southern Clay Products, the Bentone EW and Bentone LT hectorite thickeners commercially sold by Rheox, Inc., and the Laponite® hectorite thickener commercially sold by Southern Clay Products. Other acceptable inorganic thickeners include attapulgite clays, such as the Attagel attapulgite thickeners commercially sold by the Engelhard Minerals and Chemicals Corporation. Still other acceptable inorganic thickeners include fumed silicas, such as the Aerosil® fumed silicas sold commercially by Degussa Corporation and the Cab-O-Sil® and Cab-O-Sperse® fumed silicas sold commercially by Cabot Corporation, and silicon dioxides, such as Sipernat 22LS silicon dioxide sold commercially by Degussa Corporation Pigments Division. The thickening agent of the invention also can be selected from a group of complex magnesium aluminum silicates derived from natural smectite clays by a proprietary refining process and sold by R. T. Vanderbilt Company, Inc. under the trademarks VEEGUM® and VAN GEL®.

Where the enzymatic detergent drain cleaners according to the present invention are prepared in dry form, the thickener should be present in an amount of at least about 0.05% to about 5% by weight, preferably at least about 0.1% to about 4% by weight, more preferably at least about 0.5% to about 3%, and most preferably at least about 1% to about 2%. Where the compositions of the present invention are prepared in solution form, the thickener should be present in a concentration of at least about 0.01 g/l, preferably at least 0.15 g/l, more preferably at least about 0.20 g/l, and most preferably at least about 0.30 g/l.

The drain cleaners and compositions of the present invention also may include a surfactant which assists in the formation of a thickened foam with the carbon dioxide gas. A wide variety of surfactants can be used in the present invention, selected from nonionic, cationic, anionic, or amphoteric surfactants.

Examples of nonionic surfactants that can be employed are alkoxylated alkyl phenols, amides, amines, ethoxylated or propoxylated higher aliphatic alcohols, alkyl polyglucosides, alkyl polysaccharides and sulfonamides. These well known surfactants include sorbitan esters of $C_{10}$ to $C_{22}$ fatty acids, polyoxyethylene sorbitan esters of $C_{10}$ to $C_{22}$ fatty acids, polyoxyethylene sorbitol esters of $C_{10}$ to $C_{22}$ fatty acids, polyoxyethylene derivatives of $C_6$ to $C_{20}$ fatty phenols, and polyoxyethylene condensates of $C_{10}$ to $C_{22}$ fatty acids or fatty alcohols. Polyoxyethylene and polyoxypropylene analogs of the above surfactants also can be used in the present invention.

Commercially available nonionic surfactants suitable for use in this invention are Shell Neodol™ 91-6 and Shell Neodol™ 91-2.5 surfactants. Neodol™ 91-6 surfactant is a polyethylene glycol ether of a mixture of synthetic $C_{9-11}$ fatty alcohols with an average of 6 moles of ethylene oxide. Neodol™ 91-2.5 surfactant is an ethoxylated alcohol of a mixture of synthetic $C_{9-11}$ fatty alcohols with an average of 2.5 moles of ethylene oxide.

Other useful nonionic surfactants available from Shell are the Neodol 25-7 and Neodol 25-6.5 surfactants. The former is a condensation product of a mixture of higher fatty alcohols averaging about 12 to 15 carbon atoms, with about 7 moles of ethylene oxide and the latter is a corresponding mixture wherein the carbon atom content of the higher fatty alcohol is 12 to 15 and the number of ethylene oxide groups present averages about 6.5. The higher alcohols are primary alkanols. Other examples of such detergents include Tergitol® 15-S-7 and Tergitol® 15-S-9 surfactants, both of which are linear secondary alcohol ethoxylates made by Union Carbide Corp. The former is a mixed ethoxylation product of 11 to 15 carbon atoms linear secondary alkanol with seven moles of ethylene oxide and the latter is a similar product but with nine moles of ethylene oxide being reacted.

Another suitable nonionic surfactant is available from Union Carbide Corporation under the trademark Tergitol® MDS-42. This nonionic surfactant is a $C_{12}$–$C_{14}$ linear alcohol containing 55% by weight random distributed oxyalkyl groups of which 42% are ethoxy and 58% propoxy groups. Another nonionic surfactant that can be used is Alfonic 18-57 surfactant, made by Vista Chemical Company. Other useful nonionic surfactants are the Poly-Tergent S-LF surfactants available from Olin Corporation. These surfactants are alkoxylated linear fatty alcohols. Surfactants of this type are available under the tradenames Poly-Tergent S-LF 18, Poly-Tergent S-305-LF, Poly-Tergent S-405-LF and Poly-Tergent CS-1. Another liquid nonionic surfactant that can be used is sold under the tradename Lutensol SC 9713.

Syneronic nonionic surfactant from ICI such as LF/D25 surfactant are nonionic surfactants that can be used in the detergent compositions of the instant invention. Also useful in the present compositions are higher molecular weight nonionic sunfactants, such as Neodol 45-11 surfactant, which are similar ethylene oxide condensation products of higher fatty alcohols, with the higher fatty alcohol being of 14 to 15 carbon atoms and the number of ethylene oxide groups per mole being about 11. Such products are also made by Shell Chemical Company.

Still other examples of suitable nonionic surfactants include polyoxyethylene and/or polyoxypropylene condensates of aliphatic carboxylic acids, aliphatic alcohols and alkyl phenols; polyoxyethylene derivatives of sorbitan mono-, di-, and tri-fatty acid ester and polyoxyethylenepolyoxypropylene block polymers.

Further examples of suitable nonionic surfactants include alkylpolyglucoside surfactants such as disclosed in U.S. Pat. No. 5,169,553, the disclosure of which is incorporated herein by reference. These surfactants are derived from corn starch, a cellulose with α-linkages between glucose units, and coconut oil.

Still other examples of suitable nonionic surfactants include alkylpolysaccharide surfactants such as disclosed in U.S. Pat. No. 5,169,553, the disclosure of which is incorporated herein by reference.

Other suitable nonionic surfactants include ethoxylated propoxylated fatty alcohols, which are possibly capped, characterized by the presence of an organic hydrophobic group and an organic hydrophilic group and typically produced by the condensation of an organic aliphatic or alkyl aromatic hydrophobic compound with ethylene oxide and/ or, propylene oxide (hydrophilic in nature). Practically any hydrophobic compound having a carboxy, hydroxy, amido or amino group with a free hydrogen attached to the nitrogen or oxygen can be condensed with ethylene oxide or with the polyhydration product thereof, polyethylene glycol, to form a nonionic detergent. The length of the hydrophilic or polyoxyethylene chain can be readily adjusted to achieve the desired balance between the hydrophobic and hydrophilic groups.

The useful nonionic surfactants also include polyalkoxylated lipophiles wherein the desired hydrophile-lipophile balance is obtained from addition of a hydrophilic poly-lower alkoxy group to a lipophilic moiety. Examples include poly-lower alkoxylated higher alkanols wherein the alkanol is of 9 to 18 carbon atoms and wherein the number of moles of lower alkylene oxide (of 2 or 3 carbon atoms) is from 3 to 12.

Useful nonionic surfactants are represented by the Plurafac series from BASF Chemical Company which are the reaction product of a higher linear alcohol and a mixture of ethylene and propylene oxides, containing a mixed chain of ethylene oxide and propylene oxide, terminated by a hydroxyl group. Examples include a $C_{13}$–$C_{15}$ fatty alcohol, condensed with 7 moles propylene oxide and 4 moles ethylene oxide, and a C13–$C_{15}$ fatty alcohol, condensed with 5 moles propylene oxide and 10 moles ethylene oxide. Acceptable commercial products include the Plurafac LF 132 and Plurafac LF231 surfactants sold by BASF. Other suitable nonionic surfactants include sorbitol monolaurate propylene oxide condensates, sorbitol monomyristate propylene oxide condensates, sorbitol monostearate propylene oxide condensates, dodecyl phenol propylene oxide condensates, myristyl phenol propylene oxide condensates, octyl phenyl propylene oxide condensates, nonyl phenyl propylene oxide condensates, stearyl phenol propylene oxide condensates, lauryl alcohol propylene oxide condensates, stearyl alcohol propylene oxide condensates, secondary alcohol propylene oxide condensates such as $C_{14}$–$C_{15}$ secondary alcohols condensed with propylene oxide, sorbitan tristearate condensed with propylene oxide, sorbitan trioleate condensed with propylene oxide, and sorbitan trioleate.

Anionic surfactants useful in this invention generally include alkali metal, ammonium and magnesium salts of α-olefin sulfonates, alkyl sulfonates, alkyl aryl sulfonates, alkyl aryl ether sulfates, alkyl ether sulfates, sulfated alcohol ethoxylates, taurates, petroleum sulfonates, alkyl napthalene sulfonates, alkyl sarcosinates and the alkyl sulfosuccinates.

Anionic surfactants useful in the present invention are the linear or branched alkali metal mono- and di($C_{8-4}$)alkyl diphenyl oxide mono- and disulfonates, commercially available from Dow Chemical, for example as the DOWFAX™ 3B-2 and DOWFAX™ 2A-1 surfactants. Other suitable surfactants include the primary alkyl sulfates, alkyl sulfonates, alkyl aryl sulfonates, sec-alkyl sulfates and olefin sulfonate. Examples include sodium $C_{10}$–$C_{18}$ alkane sulfonates such as sodium lauryl sulfonate, sodium hexadecyl sulfonate, sodium dodecyl sulfate, sodium and tallow alcohol sulfate, and sodium $C_{12}$–$C_{18}$ alkylbenzene sulfonates such as sodium dodecylbenzene sulfonates. The corresponding potassium and magnesium salts may also be employed.

Specific anionic surfactants useful in this invention include sodium lauryl sulfonate, ammonium lauryl sulfonate, dodecyl benzene sulfonate, sodium lauryl ether sulfate, diethanolamine lauryl sulfate, ammonium salts of sulfated alcohol ethoxylates, sodium cocoyl isethionate, sodium N-methyl-N-oleoyl taurate, sodium N-methyl-N-cocyl taurate, triethanolamine lauryl sulfate, disodium monooleamide PEG-2 sulfosuccinate, petroleum sulfonates sodium salt, alkyl napthalene sodium sulfonates, sodium lauroyl sarcosinate, and sodium alkyl sulfosuccinate. Other useful anionic surfactants include sodium or potassium dodecyl sulfate, sodium trioleate, sodium or potassium stearyl sulfate, sodium or potassium dodecyl benzene sulfonate, sodium or potassium stearyl sulfonate, triethanol amine salt of dodecyl sulfate, sodium laurate, sodium or potassium myristate, and sodium or potassium stearate. Sodium dodecyl benzene sulfonate powder, sold by Stepan Chemical Company as Nacconol 90G surfactant, is preferred.

Other suitable surfactants useful herein include the amine oxide surfactants of the structure $R_2R_1NO$ in which $R_2$ and $R_1$ each represents a lower alkyl group, for instance, a lower alkyl, or a long chain alkyl group having from 8 to 22 carbon atoms, for instance a lauryl, myristyl, palmityl or cetyl group. Instead of an amine oxide, a corresponding surfactant phosphine oxide $R_2R_1PO$ or sulfoxide $R_2R_1SO$ can be employed. Betaine surfactants are typically of the $R_3R_4N^+R_5COO^-$, in which $R_3$ and $R_4$ each represents a lower alkylene group having from 1 to 5 carbon atoms and $R_5$ represents a long chain alkyl group having from 8 to 22 carbon atoms. Specific examples of the amine oxide surfactants are lauryldimethylamine oxide, myristyldimethylamine oxide, the corresponding phosphine oxides and sulfoxides, and the corresponding betaines, including dodecyldimethylammonium acetate, tetradecyldiethylammonium pentanoate, hexadecyldimethylammonium hexoanoate and the like.

Cationic surfactants useful in this invention include, e.g., the quaternary ammonium surfactants such as $C_{10}$ to $C_{22}$ fatty ammonium compounds having 10 to 22 carbon atoms, $C_{10}$ to $C_{22}$ fatty morpholine oxides, propylene oxide condensates of $C_{10}$ to $C_{22}$ fatty acid monoesters of glycerins, the mono- or diethanol amides of $C_{10}$ to $C_{22}$ fatty acids, and alkoxylated siloxane surfactants containing ethylene oxide units and/or propylene oxide units. As is known in the surfactant art, the counter ion for quaternary ammonium surfactants is usually a halide, sulfate, or methylsulfate, the chlorides being the most common industrially available compounds.

Other suitable cationic surfactants suitable for use in the present invention include straight chain alkyl fatty amines, quaternary ammonium salts, alkyl-substituted quaternary ammonium salts, alkylaryl-substituted quaternary ammonium salts, quaternary imidazolinium salts, amine oxides, fatty amine oxides, tri-fatty amine oxides, tri-quaternary phosphate esters, amphoglycinate phosphates, amine acetates, long chain amines and their salts, diamines and their salts, polyamines and their salts, polyoxyethylenated long chain amines, and quaternized polyoxyethylenated long chain amines.

Specific cationic surfactants useful in the present invention include decyldimethyl amine oxide, cocoamidodimethyl amine oxide, trimethyldodceylammonium chloride, and trimethylstearylammonium methylsulfate. Suitable, commercially available cationic surfactants include the surfactant sold under the trademark Q-17-2™ and the AO-3,8™ surfactant by the Exxon Chemical Company, Varisoft™ 222 and Arosurf™ TA-100 surfactants by the Witco Chemical Company, and Ninox L™ surfactant by the Stepan Chemical Company. Q-17-2™ surfactant by the Exxon Chemical Company is a 75% by weight aqueous solution of isotridecyloxypropyl dihydroxyethylmethylammonium chloride. The Exxon AO-3,8™ surfactant is a proprietary tertiary eight-carbon amine oxide. The Varisoft™ 222 surfactant is a diamidoamine-based quaternary with a formula of methylbis(tallow amidoethyl)2-hydroxyethyl-ammonium methyl sulfate. The Arosurf™ TA-100 surfactant is a dialkyldimethyl quaternary with the chemical composition of distearyldimethylammonium chloride. The Ninox-L™ surfactant is a lauryldimethyl amine oxide.

Amphoteric surfactants useful in this invention generally include betaines, sultaines, imidazoline derivatives and the like. Specific amphoteric surfactants useful in this invention include ricinoleamidopropyl betaine, cocamidopropyl betaine, stearyl betaine, stearyl amphocarboxy glycinate, sodium lauraminopropionate, cocoamidopropyl hydroxy sultaine, disodium lauryliminodipropionate, tallowiminodipropionate, cocoamphocarboxy glycinate, cocoimidazoline carboxylate, lauric imidazoline monocarboxylate, lauric imidazoline dicarboxylate, lauric myristic betaine, cocoamidosulfobetaine, alkylamidophospho betaine and the like. Other useful amphoteric surfactants include decylamino betaine; cocoamido sulfobetaine, oleylamido betaine, coco imidazoline, coco sulfoimidazoline, cetyl imidazoline, 1-hydroxyethyl-2-heptadecenyl imidazoline, 1-hydroxyethyl-2 mixed heptadecenyl heptadecadienyl imidazoline, and n-coco morpholine oxide. Suitable, commercially available amphoteric surfactants include Miranol™ FBS surfactant by Rhone-Poulenc and Mackalene™ 316 surfactant by McIntyre Chemical Company. The Miranol™ FBS surfactant is a 39% by weight aqueous solution of disodium cocoampho dipropionate. The Mackalene™ 316 surfactant is a stearamidopropyl dimethylamine lactate.

Any combination of nonionic, cationic, anionic, or amphoteric surfactants can be used in the present invention. It may be preferable in certain embodiments of the present invention to include a mixture of surfactants. In all embodiments, the surfactant selected should be effective to enhance formation of a thickened foam with the dissolved carbon dioxide gas. Where the enzymatic detergent drain cleaners of the present invention are prepared in dry form, the surfactant should be present in an amount of at least about 0.1% to about 10% by weight, preferably about 0.5% to about 8% by weight, more preferably about 1% to about 6% by weight, and most preferably about 2% to about 5% by weight. Where the compositions of the present invention are in solution form, the surfactant should be present in the solution in a concentration of at least about 0.05 g/l, preferably at least about 0.25 g/l, more preferably at least about 0.50 g/l, and most preferably at least about 1.0 g/l.

The effective pH range of the present drain cleaner and composition is about 2.0 to about 7.0, preferably about 3.5 to about 6.5, and more preferably about 4.0 to about 5.5. Maintenance of the pH within these ranges is accomplished by providing, if necessary, any of the pH conditioners and buffering agents well known to the art and compatible with the other elements of the drain cleaner or composition.

The effective temperature range is up to about 60° C.(140° F.), preferably about 40° to about 55° C., and more preferably about 40° to about 50° C.(about 104° to about 122° F.).

The method of the present invention generally comprises contacting an aqueous system in need of bacterial cellulose and fatty glyceride removal or prevention with the present enzymatic detergent drain cleaners or compositions under aqueous conditions for a sufficient time to at least partially hydrolyze the bacterial cellulose, triglycerides, diglycerides and monoglycerides, whereby the at least partially hydrolyzed material is removed from the aqueous system.

The method of the present invention requires no particular mode of contacting the enzymatic drain cleaner or composition with the cellulose and fatty glyceride deposit desired to be removed, provided the contact takes place for a time sufficient to allow at least partial hydrolysis, such that the degraded and hydrolyzed cellulosic materials and fatty glycerides can be removed with minimal mechanical or manual effort, such as by flushing or rinsing with tap water, by gentle mechanical agitation, or by continued use of the aqueous system being treated. Preferably, the drain cleaner or composition is permitted to contact the deposits for at least two to three hours. When the present drain cleaners or compositions have sufficient contact time with the deposits, hydrolysis of the glycerides and cellulose will result in production of monoglycerides, diglycerides, fatty acids, glycerol, water soluble glucose, and its oligomers which is easily rinsed without any mechanical action needed.

The drain cleaners, compositions, and methods of the present invention can be applied to effect both prevention and removal of fatty deposits and bacterial cellulose deposits. When used to clean drain pipes, such as soft drink and alcoholic beverage station drain pipes, the condition of the drain must be ascertained, i.e. whether the drain is fully or partially clogged. If fully clogged, the drain can be partially unblocked, typically by mechanical means such as snaking, rotor rooting, water jetting, etc., to allow the enzymatic detergent drain cleaner or composition to contact as much of the deposited cellulose and fatty glyceride as possible.

In one embodiment of the present method used to remove or prevent fatty deposits and bacterial cellulose in an aqueous drain system, a dry enzymatic detergent drain cleaner according to the present invention is added directly to a drain system through an opening in the system, such as a floor drain or any other opening that will allow access to the drain interior. Following addition of the dry product to the drain, an aqueous solution of the drain cleaner is formed in the drain by adding an aqueous medium to the drain. Preferably, the aqueous medium is hot, up to about 60° C., preferably between about 40° and about 55° C., and more preferably between about 40° and about 50° C. The resultant aqueous enzymatic solution is allowed to disperse throughout the drain system, where it contacts the fatty glyceride deposits and the bacterial cellulose deposits.

In a preferred method, the drain system is substantially closed after the dry composition is added but before the aqueous medium is added. Upon addition of the aqueous medium, the carbonate salt and acid react to form carbon dioxide, and the resultant pressure buildup in the drain in the vicinity of the reaction forces the enzymatic solution throughout the drain system and into contact with the deposited bacterial cellulose and fatty glyceride.

In another embodiment of the present method, the dry enzymatic drain cleaner of the present invention is mixed with a hot aqueous medium in a vessel to form a composition comprising an aqueous enzymatic solution, which is simply added to an aqueous system in need of removal or prevention of fatty deposits and bacterial cellulose deposits. In a more preferred method for use in treating aqueous drain systems, the vessel is the reservoir of a hand-held liquid spray apparatus, such as the Spray Doc® pressure sprayer with spray tip removed, manufactured by the Gilmour Manufacturing Co., Somerset, Pa. The resultant enzymatic solution is then applied with the spray apparatus in accordance with the manufacturer's instructions directly to the drain system in need of treatment.

The following examples are illustrative only, and are not intended to limit or otherwise circumscribe the claimed invention. One skilled in the art can make, without undue experimentation, various insubstantial substitutions and variations by equivalent means, without departing from the spirit or teaching of this invention. Similarly, although preferred embodiments of the invention are described herein in detail, one of skill in the art can make variations to those embodiments without departing from the spirit of the invention or the scope of the claims.

EXAMPLE 1

PREPARATION OF POWDERED ENZYMATIC DETERGENT DRAIN CLEANER

A powdered enzymatic detergent drain cleaner product can be prepared in any suitable mixing device. For example, a twin-shelled or Hobert mixer can be used, but a ribbon mixer also is suitable. Desired amounts of citric acid, sodium carbonate, powdered Nacconol 90G surfactant, sodium bicarbonate, Carbopol thickener, and Cellulase Tr Concentrate were weighed and set aside. The mixer was charged with the citric acid and sodium carbonate, which were mixed several minutes. When these two ingredients are thoroughly mixed, the Nacconol surfactant was added and allowed to mix for several more minutes, followed by the sodium bicarbonate addition and several more minutes of mixing. Next the Carbopol thickener was added and allowed to mix, followed by the addition of the Cellulase Tr Concentrate enzyme with several more minutes of mixing. Then the Lipase BBC enzyme was added. All the ingredients having been added, the mixture was allowed to mix for at least five minutes until a free-flowing powder was obtained. The above order of addition is not critical to the function of the product, but avoids dust formation during the mixing procedure.

EXAMPLE 2

ENZYMATIC DETERGENT DRAIN CLEANER FORMULATIONS

The following are examples of dry compositions prepared according to the present invention. All amounts are expressed as weight percentages.

TABLE 1

| Ingredients | 1 | 2 | 3 | 4 |
| --- | --- | --- | --- | --- |
| Sulfamic Acid | — | — | — | — |
| Citric Acid | 43 | 42 | 42 | 42 |
| Sodium Carbonate | 5 | 5 | 5 | 4 |

TABLE 1-continued

| Ingredients | 1 | 2 | 3 | 4 |
|---|---|---|---|---|
| Nacconol 90G | 4 | 4 | 4 | 4 |
| Sodium Bicarbonate | 40 | 40 | 42 | 39 |
| Carbopol EZ-2 | 1 | 1 | 1 | 1 |
| Cellulase TR Concentrate | 5 | 6 | 4 | 5 |
| Lipase BCC | 2 | 2 | 2 | 5 |
|  | 100% | 100% | 100% | 100% |

EXAMPLE 3

NON-FOAMING ENZYMATIC DETERGENT DRAIN CLEANER

Table II compares a dry enzymatic detergent drain cleaner formulation prepared according to the present invention (#5) with three non-foaming cleaners, wherein the sodium bicarbonate was replaced with sodium chloride (#6), sodium sulfate (#7) or additional citric acid and sodium citrate (#8). All amounts are expressed as weight percentages.

TABLE II

| Ingredients | 5 | 6 | 7 | 8 |
|---|---|---|---|---|
| Citric Acid | 39 | 20 | 20 | 35 |
| Sodium Citrate | — | 20 | 20 | 35 |
| Sodium Carbonate | 5 | 5 | 5 | 10 |
| Sodium Bicarbonate | 39 | — | — | — |
| Sodium Chloride | — | 38 | — | — |
| Sodium Sulfate | — | — | 38 | — |
| Nacconol 90G | 10 | 10 | 10 | 10 |
| Carbopol EZ-2 | 1 | 1 | 1 | 2 |
| Cellulase TR Concentrate | 4 | 4 | 4 | 6 |
| Lipase BCC | 2 | 2 | 2 | 2 |
|  | 100% | 100% | 100% | 100% |

Treatment with formulation 5 according to the present invention completely degraded the cellulose overnight. Performance of formulations 6 and 7 was very poor on hydrolysis of bacterial cellulose. Very little degradation occurred even after two weeks of soaking the cellulose with these formulations. Performance of formulation 8 was slower than formulation 5.

EXAMPLE 4

ENZYMATIC DETERGENT DRAIN CLEANER FORMULATIONS

The following are examples of dry compositions prepared according to the present invention. All amounts are expressed as weight percentages.

TABLE III

| Ingredients | 9 | 10 | 11 | 12 | 13 |
|---|---|---|---|---|---|
| Sulfamic Acid | 39 | 19 | — | — | 37 |
| Citric Acid | — | 20 | 39 | 42 | 8 |
| Sodium Bicarbonate | 39 | 39 | 39 | 39 | 33 |
| Sodium Carbonate | 5 | 5 | 5 | 5 | 5 |
| Nacconol 90G | 10 | 10 | 10 | 5 | 6 |
| Carbopol EZ-2 | 1 | 1 | 1 | 1 | 3 |

TABLE III-continued

| Ingredients | 9 | 10 | 11 | 12 | 13 |
|---|---|---|---|---|---|
| Cellulase TR Concentrate | 4 | 4 | 4 | 6 | 6 |
| Lipase BCC | 2 | 2 | 2 | 2 | 2 |
|  | 100% | 100% | 100% | 100% | 100% |

What is claimed is:

1. An enzymatic detergent drain cleaner comprising:
   (a) about 0.005% to about 20% by weight of an acid lipase having hydrolytic activity to ester bonds, specific to glyceride linkages;
   (b) about 0.005% to about 20% by weight of an acid cellulase enzyme having hydrolytic activity specific to β-glucosidic bonds;
   (c) about 1% to about 70% by weight of a water soluble carbonate salt;
   (d) about 1% to about 70% by weight of a water soluble acid that reacts in an aqueous medium at standard temperature and pressure with the carbonate salt to form at least 100 ppm carbon dioxide that dissolves in the aqueous medium;
   (e) about 0.1% to about 10% by weight of a surfactant; and
   (f) about 0.05% to about 5% by weight of a thickening agent.

2. The enzymatic detergent drain cleaner of claim 1, wherein:
   (a) the acid lipase enzyme is present in an amount of about 0.01% to about 15% by weight;
   (b) the acid cellulase enzyme is present in an amount of about 0.01% to about 15% by weight;
   (c) the water soluble carbonate salt is present in an amount of about 10% to about 50% by weight;
   (d) the water soluble acid is present in an amount of about 10% to about 50% by weight;
   (e) the surfactant is present in an amount of about 0.5% to about 8% by weight; and
   (f) the thickening agent is present in an amount of about 0.1% to about 4% by weight.

3. The enzymatic detergent drain cleaner of claim 2, wherein:
   (a) the acid lipase enzyme is present in an amount of about 0.1% to about 10% by weight;
   (b) the acid cellulase enzyme is present in an amount of about 0.1% to about 10% by weight;
   (c) the water soluble carbonate salt is present in an amount of about 13% to about 48% by weight;
   (d) the water soluble acid is present in an amount of about 13% to about 48% by weight;
   (e) the surfactant is present in an amount of about 1% to about 6% by weight; and
   (f) the thickening agent is present in an amount of about 0.5% to about 3% by weight.

4. The enzymatic detergent drain cleaner of claim 3, wherein:
   (a) the acid lipase enzyme is present in an amount of about 0.5% to about 8% by weight;
   (b) the acid cellulase enzyme is present in an amount of about 0.5% to about 8% by weight;
   (c) the water soluble carbonate salt is present in an amount of about 15% to about 45% by weight;

(d) the water soluble acid is present in an amount of about 15% to about 45% by weight;

(e) the surfactant is present in an amount of about 2% to about 5% by weight; and (f) the thickening agent is present in an amount of about 1% to about 2% by weight.

5. The enzymatic detergent drain cleaner of claim 1, wherein the water soluble carbonate salt is a carbonate salt of a metal selected from the group consisting of alkali metals and alkaline earth metals.

6. The enzymatic detergent drain cleaner of claim 1, wherein:

(a) the water soluble carbonate salt is selected from the group consisting of lithium carbonate, lithium bicarbonate, sodium and potassium sesquicarbonates, sodium carbonate, sodium bicarbonate, potassium carbonate, potassium bicarbonate, calcium carbonate, calcium bicarbonate, magnesium carbonate, and magnesium bicarbonate; and (b) the water soluble acid is selected from the group consisting of formic acid, acetic acid, hydroxy acetic acid, propionic acid, butyric acid, valeric acid, caproic acid, gluconic acid, lauric acid, palmitic acid, stearic acid, citric acid, sebacic acid, tartaric acid, succinic acid, malic acid, uric acid, polymaleic-acrylic acids, acrylic acids, polyacrylic acids, maleic acid, benzoic acid, fumaric acid, isophthalic acid, terephthalic acid, suberic acid, pimelic acid, malonic acid, glutaric acid, adipic acid, lactic acid, hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid and boric acid.

7. The enzymatic detergent drain cleaner of claim 1, wherein glucono-δ-lactone, sodium bisulfate or sodium bisulfite is used in place of the water soluble acid.

8. The enzymatic detergent drain cleaner of claim 1, wherein the acid cellulase enzyme is derived from the group consisting of *Trichoderma reesei, Aspergillus niger* and mixtures thereof.

9. The enzymatic detergent drain cleaner of claim 1, wherein the acid lipase enzyme is derived from the group consisting of *Aspergillus niger, Mucor miehel, Phizopys arrhizus, Penicillium roqueforti, Candida cylindracea, Staphylococcus aureus* and mixtures thereof.

10. The enzymatic detergent drain cleaner of claim 9, wherein the acid lipase enzyme is derived from the group consisting of *Candida cylindracea, Aspergillus niger* and mixtures thereof.

11. The enzymatic detergent drain cleaner of claim 1 comprising:

(a) about 1% to about 6% by weight of an acid lipase enzyme having hydrolytic activity to ester bonds, specific to glyceride linkages;

(b) about 2% to about 7% by weight of an acid cellulase enzyme having hydrolytic activity specific to β-glucosidic bonds;

(c) about 10% to about 50% by weight of an acid selected from the group consisting of sulfamic acid and citric acid;

(d) about 30% to about 50% by weight of sodium bicarbonate;

(e) about 1% to about 10% by weight of sodium carbonate;

(f) about 2% to about 10% by weight of a powdered sodium dodecyl benzene sulfonate surfactant; and (g) about 1% to about 5% by weight of a crosslinked polyacrylic acid thickening agent.

12. An enzymatic detergent drain cleaner consisting essentially of:

(a) about 0.005% to about 20% by weight of an acid lipase having hydrolytic activity to ester bonds, specific to glyceride linkages;

(b) about 0.005% to about 20% by weight of an acid cellulase enzyme having hydrolytic activity specific to β-glucosidic bonds;

(c) about 1% to about 70% by weight of a water soluble carbonate salt;

(d) about 1% to about 70% by weight of a water soluble acid that reacts in an aqueous medium at standard temperature and pressure with the carbonate salt to form at least 100 ppm carbon dioxide that dissolves in the aqueous medium;

(e) about 0.1% to about 10% by weight of a surfactant; and (f) about 0.05% to about 5% by weight of a thickening agent.

13. The enzymatic detergent drain cleaner of claim 12, wherein:

(a) the acid lipase enzyme is present in an amount of about 0.01% to about 15% by weight;

(b) the acid cellulase enzyme is present in an amount of about 0.01% to about 15% by weight;

(c) the water soluble carbonate salt is present in an amount of about 10% to about 50% by weight;

(d) the water soluble acid is present in an amount of about 10% to about 50% by weight;

(e) the surfactant is present in an amount of about 0.5% to about 8% by weight; and (f) the thickening agent is present in an amount of about 0.1% to about 4% by weight.

14. The enzymatic detergent drain cleaner of claim 13, wherein:

(a) the acid lipase enzyme is present in an amount of about 0. 1% to about 10% by weight;

(b) the acid cellulase enzyme is present in an amount of about 0.1% to about 10% by weight;

(c) the water soluble carbonate salt is present in an amount of about 13% to about 48% by weight;

(d) the water soluble acid is present in an amount of about 13% to about 48% by weight;

(e) the surfactant is present in an amount of about 1% to about 6% by weight; and (f) the thickening agent is present in an amount of about 0.5% to about 3% by weight.

15. The enzymatic detergent drain cleaner of claim 14, wherein:

(a) the acid lipase enzyme is present in an amount of about 1% to about 6% by weight;

(b) the acid cellulase enzyme is present in an amount of about 2% to about 7% by weight;

(c) the water soluble carbonate salt is present in an amount of about 15% to about 45% by weight;

(d) the water soluble acid is present in an amount of about 15% to about 45% by weight;

(e) the surfactant is present in an amount of about 2% to about 5% by weight; and (f) the thickening agent is present in an amount of about 1% to about 2% by weight.

16. The enzymatic detergent drain cleaner of claim 12, wherein the water soluble carbonate salt is a carbonate salt of a metal selected from the group consisting of alkali metals and alkaline earth metals.

17. The enzymatic detergent drain cleaner of claim 12, wherein:

(a) the water soluble carbonate salt is selected from the group consisting of lithium carbonate, lithium bicarbonate, sodium and potassium sesquicarbonates, sodium carbonate, sodium bicarbonate, potassium carbonate, potassium bicarbonate, calcium carbonate, calcium bicarbonate, magnesium carbonate, and magnesium bicarbonate; and (b) the water soluble acid is selected from the group consisting of formic acid, acetic acid, hydroxy acetic acid, propionic acid, butyric acid, valeric acid, caproic acid, gluconic acid, lauric acid, palmitic acid, stearic acid, citric acid, sebacic acid, tartaric acid, succinic acid, malic acid, uric acid, polymaleic-acrylic acids, acrylic acids, polyacrylic acids, maleic acid, benzoic acid, fumaric acid, isophthalic acid, terephthalic acid, suberic acid, pimelic acid, malonic acid, glutaric acid, adipic acid, lactic acid, hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid and boric acid.

18. The enzymatic detergent drain cleaner of claim 12, wherein glucono-δ-lactone, sodium bisulfate or sodium bisulfite is used in place of the water soluble acid.

19. The enzymatic detergent drain cleaner of claim 12, wherein the acid cellulase enzyme is derived from the group consisting of *Trichoderma reesei, Aspergillus niger* and mixtures thereof.

20. The enzymatic detergent drain cleaner of claim 12, wherein the acid lipase enzyme is derived from the group consisting of *Aspergillus niger, Mucor miehel, Phizopys arrhizus, Penicillium roqueforti, Candida cylindracea, Staphylococcus aureus* and mixtures thereof.

21. The enzymatic detergent drain cleaner of claim 20, wherein the acid lipase enzyme is derived from the group consisting of *Candida cylindracea, Aspergillus niger* and mixtures thereof.

22. The enzymatic detergent drain cleaner of claim 12 consisting essentially of:

(a) about 1% to about 6% by weight of an acid lipase enzyme;

(b) about 2% to about 7% by weight of an acid cellulase enzyme having hydrolytic activity specific to β-glucosidic bonds;

(c) about 10% to about 50% by weight of an acid selected from the group consisting of sulfamic acid and citric acid;

(d) about 30% to about 50% by weight of sodium bicarbonate;

(e) about 1% to about 10% by weight of sodium carbonate;

(f) about 2% to about 10% by weight of a powdered sodium dodecyl benzene sulfonate surfactant; and (g) about 1% to about 5% by weight of a crosslinked polyacrylic acid thickening agent.

23. The enzymatic detergent drain cleaner of claim 1, wherein the drain cleaner is substantially free of sodium chloride.

24. The enzymatic detergent drain cleaner of claim 11, wherein the drain cleaner is substantially free of sodium chloride.

25. The enzymatic detergent drain cleaner of claim 22, wherein the drain cleaner is substantially free of sodium chloride.

26. An enzymatic detergent drain cleaner comprising:

(a) about 0.005% to about 20% by weight of an acid lipase having hydrolytic activity to ester bonds, specific to glyceride linkages;

(b) about 1% to about 70% by weight of a water soluble carbonate salt;

(c) about 1% to about 70% by weight of a water soluble acid that reacts in an aqueous medium at standard temperature and pressure with the carbonate salt to form carbon dioxide that dissolves in the aqueous medium;

(d) about 0.1% to about 10% by weight of a surfactant; and (e) about 0.05% to about 5% by weight of a thickening agent.

27. The enzymatic detergent drain cleaner of claim 24, wherein the water soluble carbonate salt is a carbonate salt of a metal selected from the group consisting of alkali metals and alkaline earth metals.

28. The enzymatic detergent drain cleaner of claim 26, wherein:

(a) the water soluble carbonate salt is selected from the group consisting of lithium carbonate, lithium bicarbonate, sodium and potassium sesquicarbonates, sodium carbonate, sodium bicarbonate, potassium carbonate, potassium bicarbonate, calcium carbonate, calcium bicarbonate, magnesium carbonate, and magnesium bicarbonate; and (b) the water soluble acid is selected from the group consisting of formic acid, acetic acid, hydroxy acetic acid, propionic acid, butyric acid, valeric acid, caproic acid, gluconic acid, lauric acid, palmitic acid, stearic acid, citric acid, sebacic acid, tartaric acid, succinic acid, malic acid, uric acid, polymaleic-acrylic acids, acrylic acids, polyacrylic acids, maleic acid, benzoic acid, fumaric acid, isophthalic acid, terephthalic acid, suberic acid, pimelic acid, malonic acid, glutaric acid, adipic acid, lactic acid, hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid and boric acid.

29. The enzymatic detergent drain cleaner of claim 26, wherein glucono-δ-lactone, sodium bisulfate or sodium bisulfite is used in place of the water soluble acid.

30. The enzymatic detergent drain cleaner of claim 26, wherein the acid lipase enzyme is derived from the group consisting of *Aspergillus niger, Mucor miehel, Phizopys arrhizus, Penicillium roquefodti, Candida cylindracea, Staphylococcus aureus* and mixtures thereof.

31. The enzymatic detergent drain cleaner of claim 30, wherein the acid lipase enzyme is derived from the group consisting of *Aspergillus niger, Candida cylindracea* and mixtures thereof.

32. A composition for removing or preventing bacterial cellulose and glyceride deposits in an aqueous system, comprising an aqueous solution of 1) an acid lipase enzyme present in an amount of at least about 0.005% by weight and having hydrolytic activity to ester bonds, specific to glyceride linkages, and 2) an acid cellulase enzyme present in an amount of at least about 0.005% by weight and having hydrolytic activity specific to β-glucosidic bonds, said aqueous solution having a dissolved carbon dioxide concentration of at least about 100 ppm at standard temperature and pressure.

33. The composition of claim 32, wherein the acid lipase enzyme is present in an amount ranging from about 0.005% to about 20% by weight and the acid cellulase enzyme is present in an amount ranging from about 0.005% to about 20% by weight.

34. The composition of claim 32, wherein the dissolved carbon dioxide concentration is at least about 300 ppm at standard temperature and pressure.

35. The composition of claim 34, wherein the dissolved carbon dioxide concentration is at least about 500 ppm at standard temperature and pressure.

36. The composition of claim 32, wherein said carbon dioxide concentration is provided at least in part by a system for enriching the aqueous system with dissolved carbon dioxide, comprising a water soluble carbonate salt and a water soluble acid that, under aqueous conditions, reacts with the salts to form carbon dioxide that dissolves in the aqueous system.

37. The composition of claim 36, wherein:
(a) the water soluble carbonate salt is selected from the group consisting of carbonate salts of alkali metals, carbonate salts of alkaline earth metals, ammonium carbonate, and ammonium bicarbonate; and
(b) the water soluble acid is selected from the group consisting of formic acid, acetic acid, hydroxyacetic acid, propionic acid, butyric acid, valeric acid, caproic acid, lauric acid, palmitic acid, stearic acid, citric acid, sebacic acid, gluconic acid, tartaric acid, succinic acid, malic acid, uric acid, polymaleic-acrylic acids, acrylic acids, polyacrylic acids, maleic acid, benzoic acid, fumaric acid, isophthalic acid, terephthalic acid, suberic acid, pimelic acid, malonic acid, glutaric acid, adipic acid, lactic acid, hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid and boric acid.

38. The composition of claim 36, wherein glucono-δ-lactone, sodium bisulfate or sodium bisulfite is used in place of the water soluble acid.

39. The composition of claim 36, further comprising a surfactant and a thickening agent.

40. The composition of claim 39, the surfactant is present in an amount of at least about 0.05 g/l, and the thickening agent is present in an amount of at least about 0.01 g/l.

41. The composition of claim 40, wherein the surfactant is present in an amount of at least about 0.25 g/l, and the thickening agent is present in an amount of at least about 0.15 g/l.

42. The composition of claim 32, wherein the aqueous solution has a temperature of up to about 60° C. and a pH of about 2 to about 7.

43. The composition of claim 41, wherein the aqueous solution has a temperature of 40° to 55° C. and a pH of about 3.5 to about 6.5.

44. The composition of claim 43, wherein the aqueous solution has a temperature of about 40° to about 50° C. and a pH of about 4 to about 5.5.

45. The composition of claim 32, wherein the acid lipase enzyme is derived from the group consisting of *Trichoderma reesei, Aspergillus niger*, mutants or variants thereof, and mixtures thereof.

46. The composition of claim 32, wherein the acid lipase enzyme is derived from the group consisting of *Aspergillus niger, Mucor miehel, Phizopys arrhizus, Penicillium roqueforti, Candida cylindracea, Staphylococcus aureus* and mixtures thereof.

47. The composition of claim 46, wherein the acid lipase enzyme is derived from the group consisting of *Candida Cylindracea, Aspergillus niger* and mixtures thereof.

48. A method of removing or preventing bacterial cellulose and glyceride deposits in an aqueous system comprising:
(a) forming an aqueous solution by adding together the enzymatic detergent drain cleaner of claim 1 with an aqueous medium;
(b) contacting an aqueous system in recognized need of such removal or prevention with the aqueous solution for a sufficient time to at least partially hydrolyze the bacterial cellulose and glycerides; and
(c) removing the partially hydrolyzed bacterial cellulose and partially or completely hydrolyzed glycerides from said aqueous system.

49. The method of claim 48, wherein the aqueous solution has a temperature of up to about 60° C. and a pH of about 2 to about 7.

50. The method of claim 49, wherein the aqueous solution has a temperature of 40° C. to about 55° C. and a pH of about 3.5 to about 6.5.

51. A method of removing or preventing bacterial cellulose and glyceride deposits in an aqueous system comprising:
(a) forming an aqueous solution by adding together the enzymatic detergent drain cleaner of claim 12 with an aqueous medium;
(b) contacting an aqueous system in recognized need of such removal or prevention with the aqueous solution for a sufficient time to at least partially hydrolyze the bacterial cellulose and glycerides; and
(c) removing the partially hydrolyzed bacterial cellulose and partially or completely hydrolyzed glycerides from said aqueous system.

52. The method of claim 51, wherein the aqueous solution has a temperature of up to about 60° C. and a pH of about 2 to about 7.

53. The method of claim 52, wherein the aqueous solution has a temperature of 40° C. to about 55° C. and a pH of about 3.5 to about 6.5.

54. A method of removing or preventing bacterial cellulose and glyceride deposits in an aqueous system comprising the step of contacting an aqueous system in recognized need of such removal or prevention with the composition of claim 1 for a sufficient time to at least partially hydrolyze the bacterial cellulose and glyceride deposits, wherein the partially hydrolyzed bacterial cellulose and partially or completely hydrolyzed glycerides from said aqueous system.

55. A method of removing or preventing bacterial cellulose and glyceride deposits in an aqueous system comprising the step of contacting an aqueous system in recognized need of such removal or prevention with the composition of claim 12 for a sufficient time to at least partially hydrolyze the deposits, wherein the partially hydrolyzed bacterial cellulose and partially or completely hydrolyzed glycerides from said aqueous system.

* * * * *

UNITED STATES PATENT AND TRADEMARK OFFICE
CERTIFICATE OF CORRECTION

PATENT NO.   : 5,975,095
DATED        : November 2, 1999
INVENTOR(S)  : Fahim Ahmed et al.

It is certified that error appears in the above-identified patent and that said Letters Patent is hereby corrected as shown below:

<u>Column 27,</u>
Line 2, after "glycerides" insert -- are removed --.

<u>Column 28,</u>
Line 3, after "glycerides" insert -- are removed --.

Signed and Sealed this

Thirteenth Day of August, 2002

Attest:

Attesting Officer

JAMES E. ROGAN
Director of the United States Patent and Trademark Office